(12) United States Patent
Mansfield-Marcoux et al.

(10) Patent No.: US 9,366,367 B2
(45) Date of Patent: Jun. 14, 2016

(54) COOLING TUBE FOR A RAM AIR FAN (RAF) ASSEMBLY

(71) Applicant: HAMILTON SUNDSTRAND CORPORATION, Windsor Locks, CT (US)

(72) Inventors: Danielle Mansfield-Marcoux, Enfield, CT (US); Brian Cabello, Windsor, CT (US); William R. Fiske, Springfield, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 317 days.

(21) Appl. No.: 13/889,627

(22) Filed: May 8, 2013

(65) Prior Publication Data

US 2014/0335772 A1    Nov. 13, 2014

(51) Int. Cl.
  *B64D 41/00*    (2006.01)
  *F16L 13/08*    (2006.01)
  *F16L 9/00*    (2006.01)
  *F16L 23/026*    (2006.01)
  *B64D 13/00*    (2006.01)

(52) U.S. Cl.
  CPC . *F16L 13/08* (2013.01); *F16L 9/00* (2013.01); *F16L 23/026* (2013.01); *B64D 13/00* (2013.01); *B64D 41/007* (2013.01)

(58) Field of Classification Search
  CPC .......... B64D 41/007; F16L 13/08; F16L 23/00
  See application file for complete search history.

(56) References Cited

U.S. PATENT DOCUMENTS

| | | |
|---|---|---|
| 2006/0061221 A1 | 3/2006 | McAuliffe et al. |
| 2012/0011878 A1 | 1/2012 | Hipsky |
| 2012/0014784 A1* | 1/2012 | Hipsky et al. .................. 415/177 |
| 2013/0022443 A1 | 1/2013 | Beers et al. |

OTHER PUBLICATIONS

AWS Brazing Handbook. American Welding Society (2007). pp. 1-66, 137-143, 609-621.*

* cited by examiner

*Primary Examiner* — Timothy D Collins
*Assistant Examiner* — Michael Kreiner
(74) *Attorney, Agent, or Firm* — Cantor Colburn LLP (57) ABSTRACT

A cooling tube includes a tube member extending from a first end to a second end through an intermediate portion having an outer surface and an inner surface. The outer surface has an outside diameter. A flange is mounted at one of the first and second ends of the tube member. The flange includes a flange body extending from a first end portion to a second end portion through an intermediate section having an outer surface and an inner surface. The inner surface defines an inside diameter. The outside diameter of the tube member is between about 0.010-inch (0.0254-cm) and about 0.030-inch (0.0762-cm) smaller than the inside diameter of the flange.

20 Claims, 9 Drawing Sheets

COOLING TUBE FOR A RAM AIR FAN (RAF) ASSEMBLY

BACKGROUND OF THE INVENTION

Exemplary embodiments pertain to the art of aircraft systems and, more particularly, to a cooling tube for a ram air fan (RAF) assembly.

Fans are often used to move air. Fans may, for example, move air through heat exchangers of air conditioning packs for aircraft. The air moved by the fans cools the heat exchangers. Such fans within aircraft are often RAM air fans. In flight, air is introduced into a RAM air device to drive the fans. When the aircraft is stationary, electric motors drive the RAM air fans to create the desired airflow. A cooling tube extends between a motor driving the RAM air fan and an outer housing of the RAM air device. The cooling tube provides a conduit through which passes an airflow to bearings provided in the motor.

BRIEF DESCRIPTION OF THE INVENTION

Disclosed is a cooling tube including a tube member extending from a first end to a second end through an intermediate portion having an outer surface and an inner surface. The outer surface has an outside diameter. A flange is mounted at one of the first and second ends of the tube member. The flange includes a flange body extending from a first end portion to a second end portion through an intermediate section having an outer surface and an inner surface. The inner surface defines an inside diameter. The outside diameter of the tube member is between about 0.010-inch (0.0254-cm) and about 0.030-inch (0.0762-cm) smaller than the inside diameter of the flange.

Also disclosed is a ram air fan (RAF) assembly including a housing having an outer surface and an inner surface that defines an interior portion and an outlet, and a fan housing including a fan motor and a cooling air inlet portion arranged within the interior portion. A cooling tube extends between the outer surface of the housing and the cooling air inlet portion of the fan housing. The cooling tube includes a tube member extending from a first end to a second end through an intermediate portion having an outer surface and an inner surface. The outer surface has an outside diameter. A flange is mounted at one of the first and second ends of the tube member. The flange includes a flange body extending from a first end portion to a second end portion through an intermediate section having an outer surface and an inner surface. The inner surface defines an inside diameter. The outside diameter of the tube member is between about 0.010-inch (0.0254-cm) and about 0.030-inch (0.0762-cm) smaller than the inside diameter of the flange.

An aircraft includes a fuselage extending from a nose portion to a tail portion through a body portion. First and second wings project from the body portion. A ram air fan (RAF) assembly is mounted within the fuselage. The RAF assembly includes a housing including an outer surface and an inner surface that defines an interior portion, and an outlet, a fan housing including a fan motor arranged within the interior portion and a cooling air inlet portion, and a cooling tube extending between the outer surface of the housing and the cooling air inlet portion of the fan housing. The cooling tube includes a tube member extending from a first end to a second end through an intermediate portion having an outer surface and an inner surface. The outer surface has an outside diameter. A flange is mounted at one of the first and second ends of the tube member. The flange includes a flange body extending from a first end portion to a second end portion through an intermediate section having an outer surface and an inner surface. The inner surface defines an inside diameter. The outside diameter of the tube member is between about 0.010-inch (0.0254-cm) and about 0.030-inch (0.0762-cm) smaller than the inside diameter of the flange.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
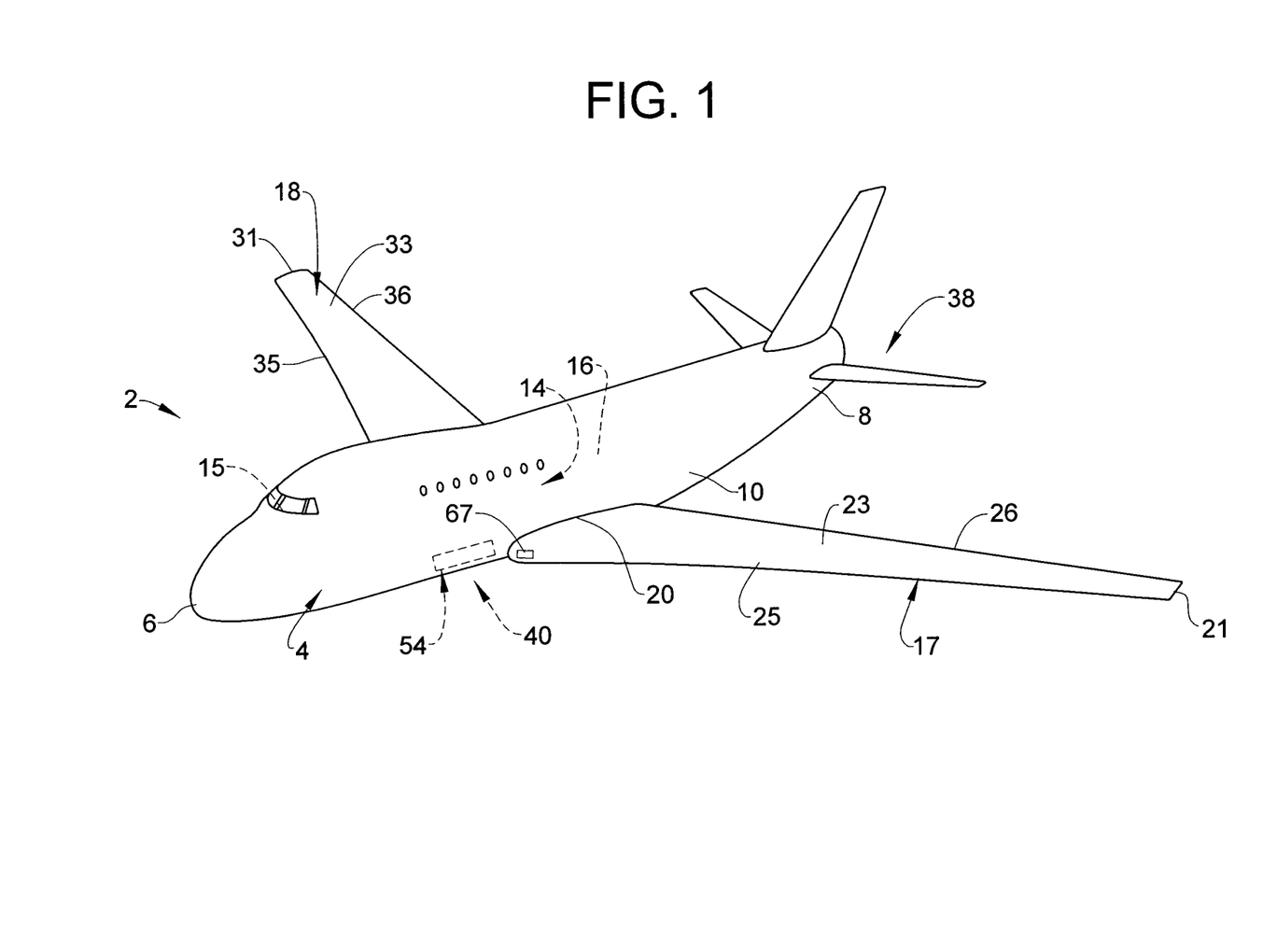
FIG. 1 is a perspective view of an aircraft having a cooling tube for a ram air fan (RAF) assembly in accordance with an exemplary embodiment

An aircraft, in accordance with an exemplary embodiment, is indicated generally at 2, in FIG. 1. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38.

Figure 2:
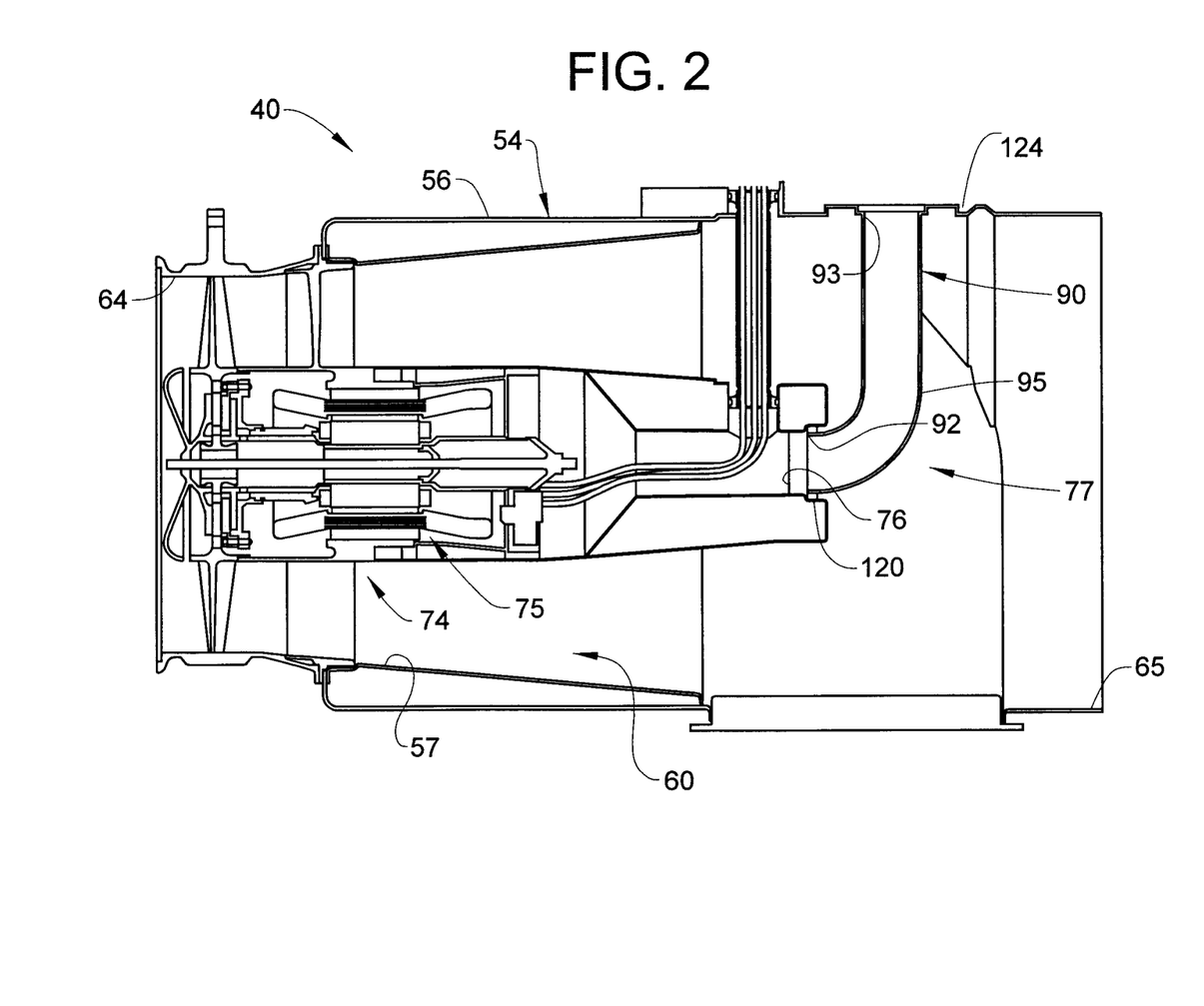
FIG. 2 is a cross-sectional side view of the RAF assembly of FIG. 1 including the cooling tube in accordance with an exemplary embodiment.

Aircraft 2 includes a ram air fan (RAF) assembly 40 mounted within fuselage 4. As shown in FIG. 2, and with reference to both FIG. 1 and FIG. 2, RAF assembly 40 includes a housing 54 including an outer surface 56 and an inner surface 57 that defines a diffuser. Housing 54 includes an interior portion 60 having an inlet 64 and an outlet 65. Inlet 64 receives an airflow via an opening 67 formed in first wing 17. It should be understood that opening 67 may also be arranged in other locations along fuselage 4. Outlet 65 delivers a conditioned airflow to, for example, crew compartment 15 and passenger compartment 16. The conditioned airflow may also be delivered to other areas in aircraft 2. RAF assembly 40 includes a fan housing 74 arranged within interior portion 60. Fan housing 74 supports a fan motor 75 and includes a cooling air inlet portion 76. Cooling air inlet portion 76 is fluidically connected to outer surface 56 of housing 54 through a cooling tube 77. Cooling tube 77 provides a conduit that delivers a flow of air to bearings (not separately labeled) that support fan motor 75.

Figure 3:
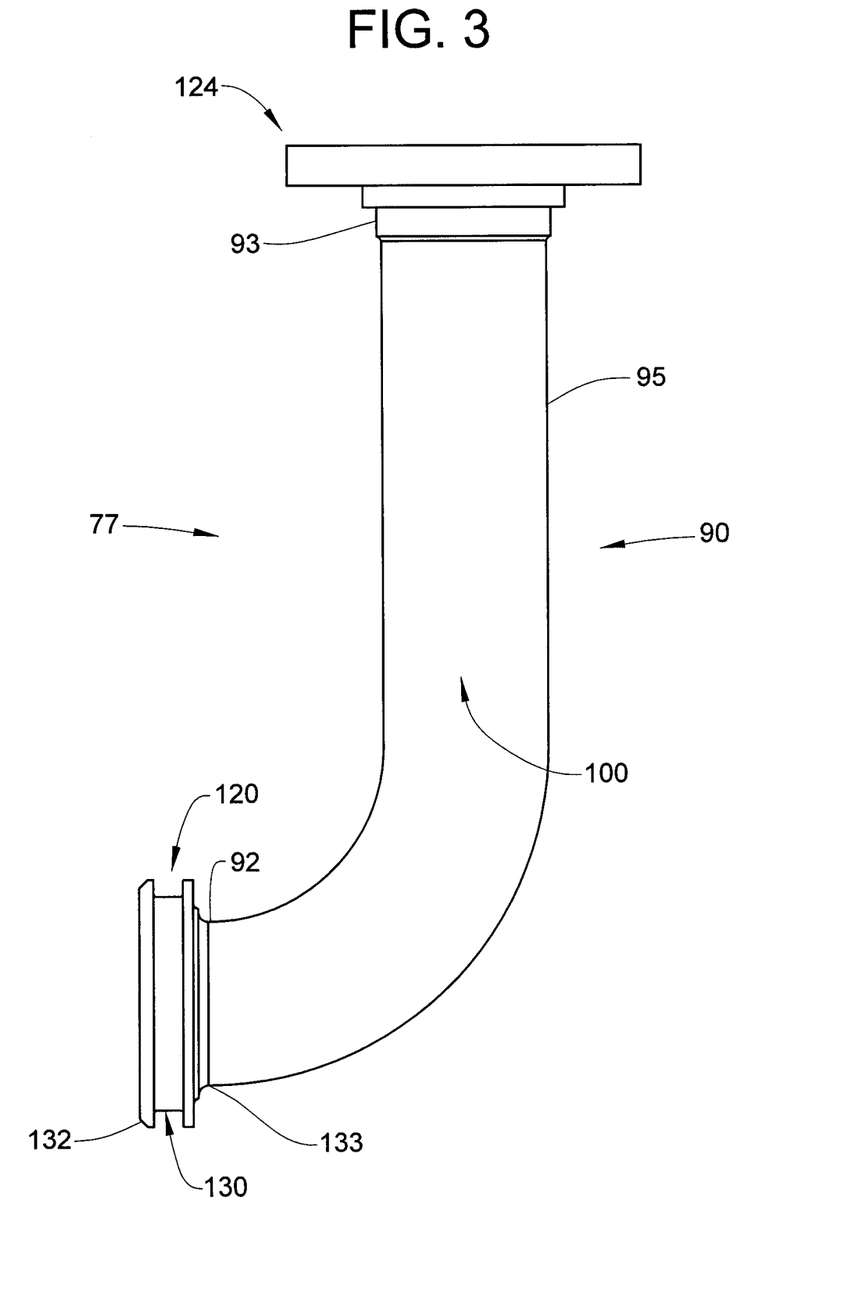
FIG. 3 is a perspective view of the cooling tube in accordance with an exemplary embodiment.
Figure 4:
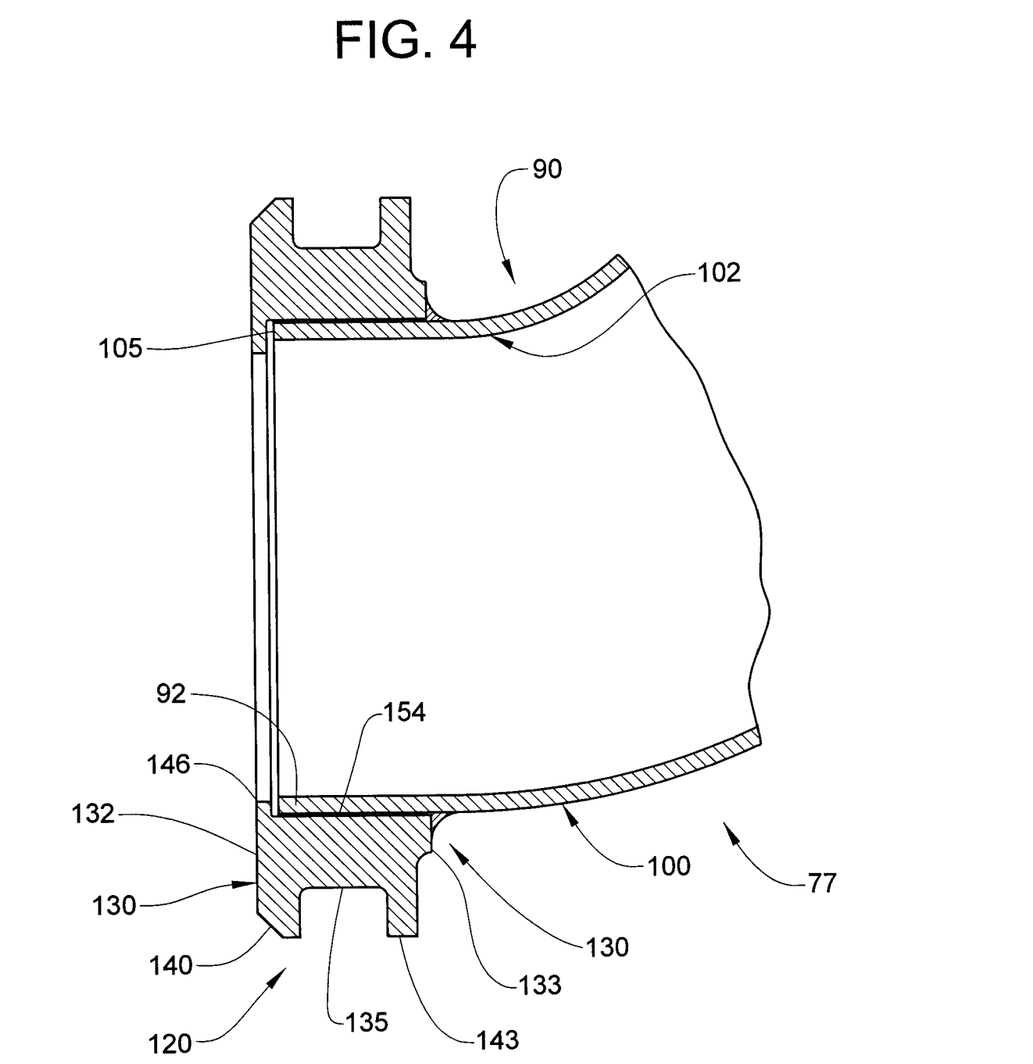
FIG. 4 is a cross-sectional view of a first end of the cooling tube of FIG. 3.
Figure 5:
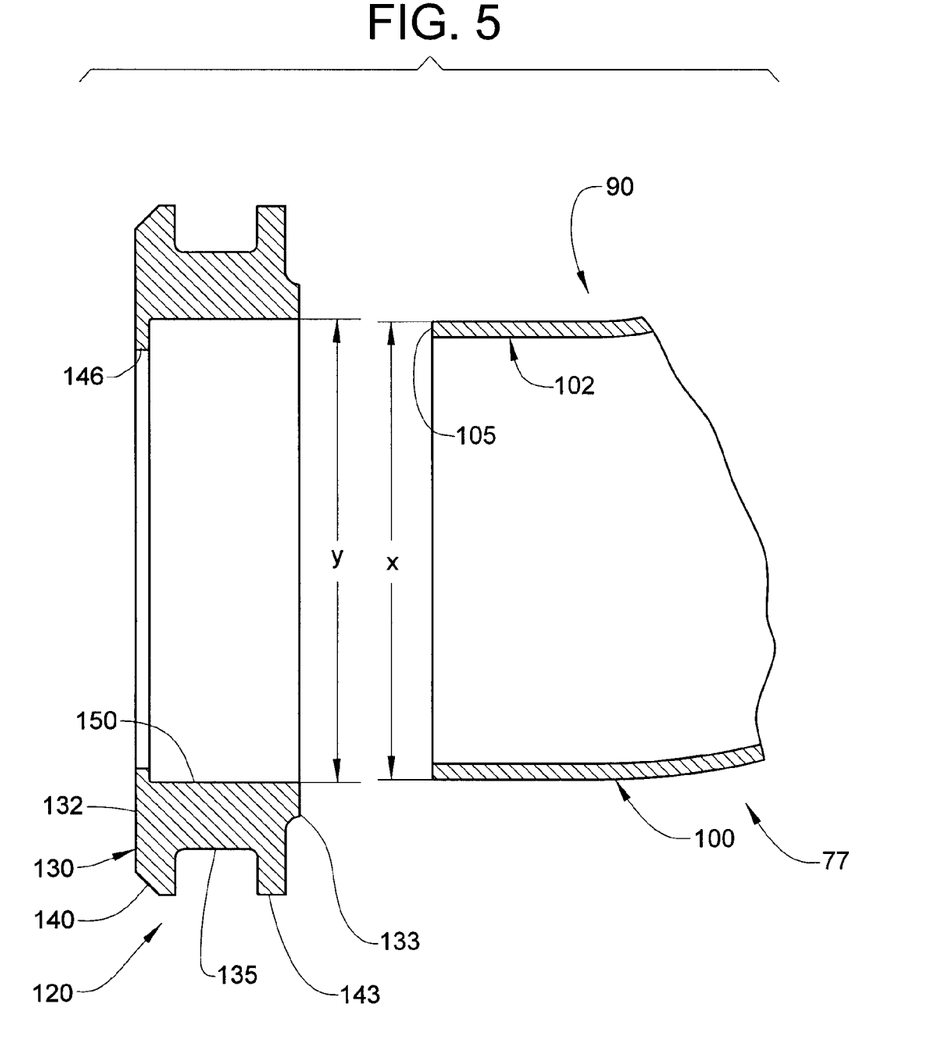
FIG. 5 is a disassembled view of the first end of the cooling tube of FIG. 4.
Figure 6:
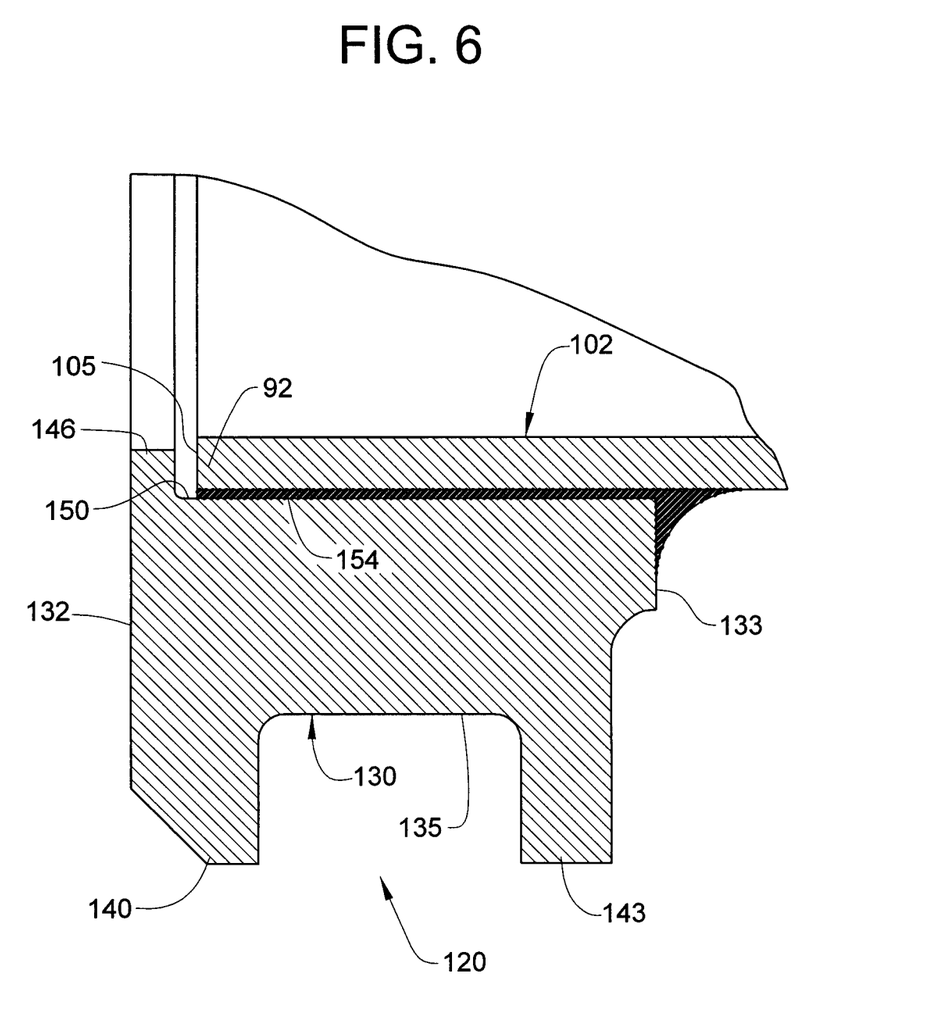
FIG. 6 is a detailed view of a portion of the first end of the cooling tube illustrated in FIG. 4.

As best shown in FIGS. 3-5, cooling tube 77 includes a tube member 90 that extends from a first end 92, that defines an outlet, to a second end 93, that defines an inlet, through an intermediate portion 95. Intermediate portion 95 includes an outer surface 100 and an inner surface 102. First end 92 includes a first end face 105 (FIG. 4) and second end 93 includes a second end face 106 (FIG. 6). A first flange 120 is arranged at first end 92 and a second flange 124 is arranged at second end 93. First and second flanges 120 and 124 provide an interface between cooling tube 77 and corresponding ones of housing 54 and fan housing 74.

First flange 120 includes a first flange body 130 that extends from a first end portion 132 to a second end portion 133 through an intermediate section 135. A first annular rib 140 is arranged at first end portion 132 and a second annular rib 143 is arranged proximate to second end portion 133. An annular lip 146 projects radially inwardly at first end portion 132. First flange 120 includes an inner surface 150 that is bonded to tube member 90. Outer surface 100 of tube member 90 defines an outer diameter "x". Inner surface 150 of first flange 120 defines an inner diameter having a dimension "y".

In accordance with an exemplary embodiment, dimension "x" is between about 0.010-inch (0.0254-cm) and about 0.030-inch (0.0762-cm) smaller than dimension "y". In accordance with an aspect of the exemplary embodiment, dimension "x" is about 0.020-inch (0.0508-cm) smaller than dimension "y". In accordance with another aspect of the exemplary embodiment, dimension "y" is between about 0.5% and about 1.5% larger than dimension "x". In accordance with one example, dimension "x" is between about 2.015-inch (5.118-cm) and about 2.025-inch (5.143-cm). In accordance with another example, dimension "x" is about 2.020-inch (5.131-cm). In accordance with another example, dimension "y" is between about 1.995-inch (5.067-cm) and about 2.005-inch (5.093-cm). In accordance with another example, dimension "y" is about 2.000-inch (5.080-cm).

The outer diameter of tube member 90 is smaller than the inner diameter of first flange 120. In this manner, a gap (not separately labeled) is formed between outer surface 100 and inner surface 150 when first flange 120 is mounted to first end 92. The gap provides an area that accommodates an introduction of a metallurgical bonding material 154 that joins first flange 120 to first end 92. In accordance with an aspect of the exemplary embodiment, metallurgical bonding material 154 includes a brazing material. In accordance with another aspect of the exemplary embodiment, first end 92 is devoid of any metallurgical bonding material 154 when first flange 120 is joined to tube member 90.

Figure 7:
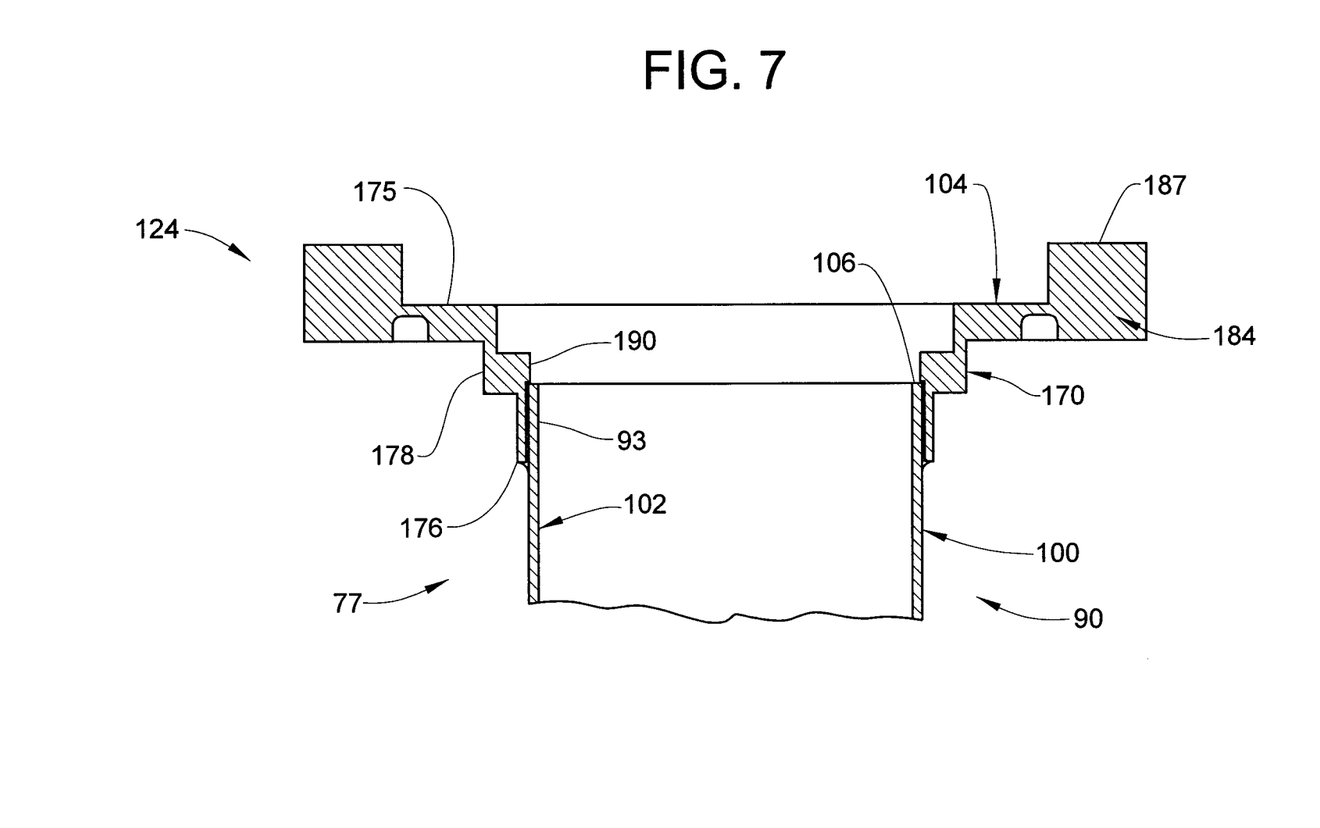
FIG. 7 is a cross-sectional view of a second end of the cooling tube of FIG. 3.
Figure 8:
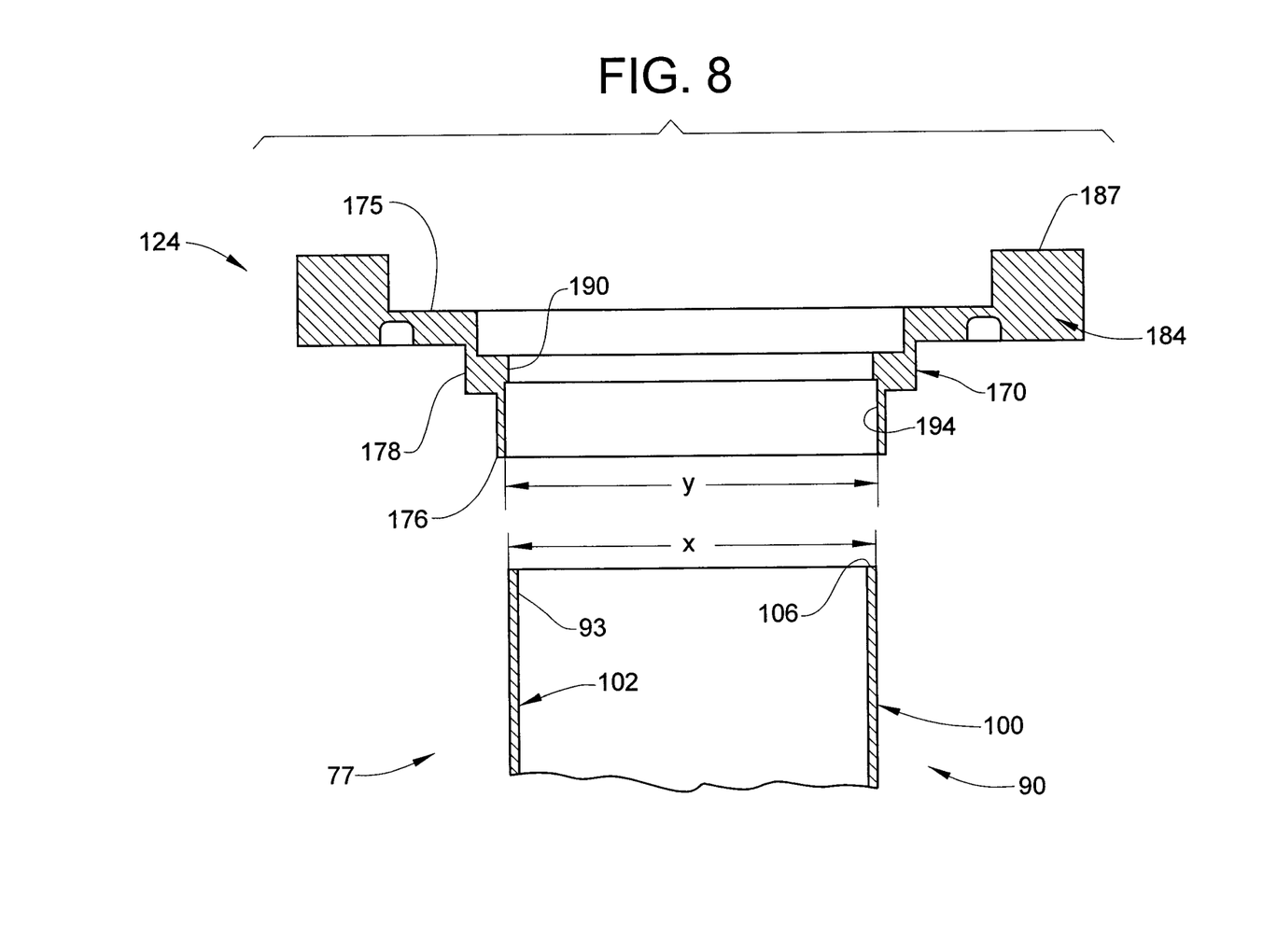
FIG. 8 is a disassembled view of the second end of the cooling tube of FIG. 7.
Figure 9:
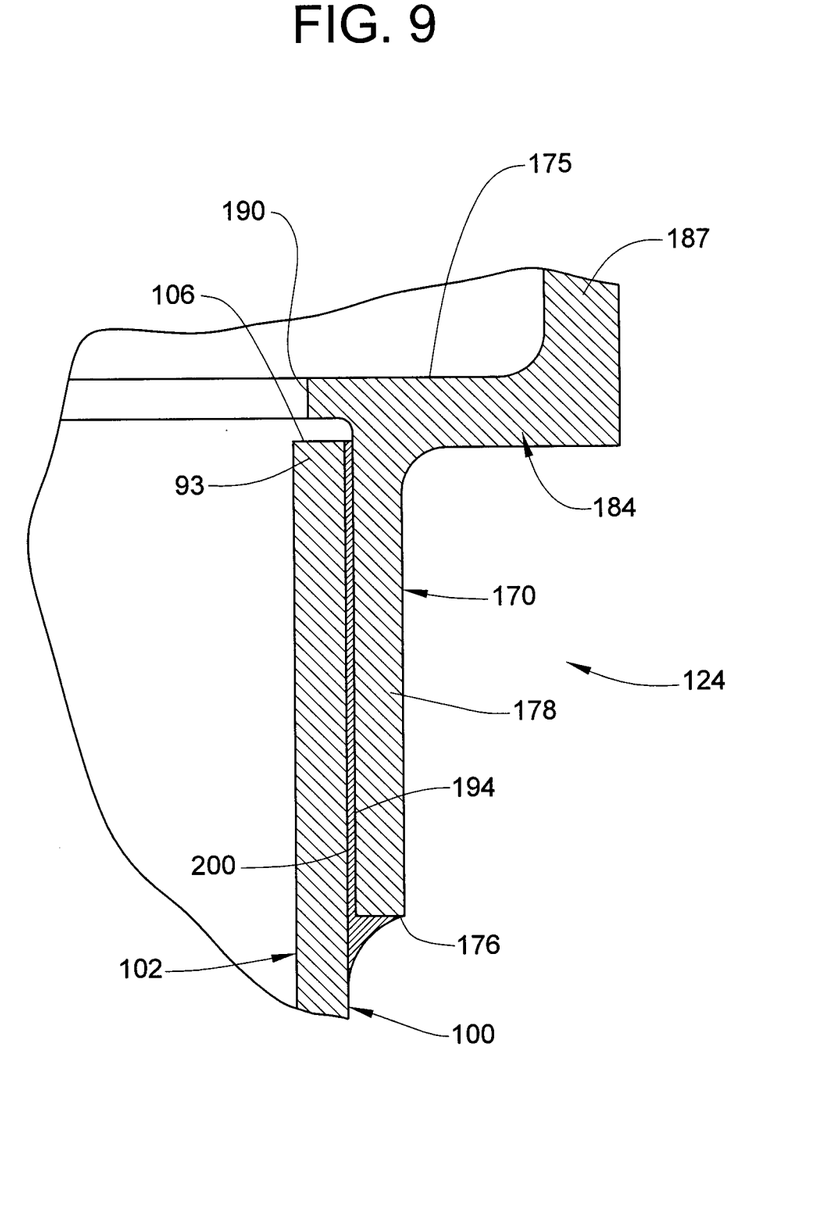
FIG. 9 is a detailed view of a portion of the second end of the cooling tube illustrated in FIG. 7.

Second flange 124 includes a second flange body 170 that extends from a first end portion 175 to a second end portion 176 through an intermediate section 178. An annular mounting element 184 is arranged at first end portion 175. Annular mounting element 184 includes an annular rib 187 that facilitates a connection between cooling tube 77 and outlet 65. An annular lip 190 projects radially inwardly at first end portion 175. Second flange 124 includes an inner surface 194 that is bonded to tube member 90. Inner surface 194 of second flange 124 defines an inner diameter having a dimension "z".

In accordance with an exemplary embodiment, dimension "x" is between about 0.010-inch (0.0254-cm) and about 0.030-inch (0.0762-cm) smaller than dimension "z". In accordance with an aspect of the exemplary embodiment, dimension "x" is about 0.020-inch (0.0508-cm) smaller than dimension "z". In accordance with another aspect of the exemplary embodiment, dimension "z" is between about 0.5% and about 1.5% larger than dimension "x". In accordance with one example, dimension "z" is between about 1.995-inch (5.067-cm) and about 2.005-inch (5.093-cm). In accordance with another example, dimension "z" is about 2.000-inch (5.080-cm).

The outer diameter of tube member 90 is smaller than the inner diameter of second flange 124. In this manner, a gap (not separately labeled) is formed between outer surface 100 and inner surface 194 when second flange 124 is mounted to second end 93. The gap provides an area that accommodates an introduction of a metallurgical bonding material 200 that joins second flange 124 to second end 93. In accordance with an aspect of the exemplary embodiment, metallurgical bonding material 200 includes a brazing material. In accordance with another aspect of the exemplary embodiment, second end 93 is devoid of any metallurgical bonding material 200 when second flange 124 is joined to tube member 90. The particular sizing of tube member 90 and first and second flanges 120 and 124 coupled with the use of a metallurgical bonding material provides a resilient connection that withstands vibration and other environmental factors associated with RAF assembly 40.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A cooling tube comprising:
   a tube member extending from a first end to a second end through an intermediate portion having an outer surface and an inner surface, the outer surface having an outside diameter; and
   a flange mounted at one of the first and second ends of the tube member, the flange including a flange body extending from a first end portion to a second end portion through an intermediate section having an outer surface and an inner surface, the inner surface defining an inside diameter, wherein the outside diameter of the tube member is between about 0.010-inch (0.0254-cm) and about 0.030-inch (0.0762-cm) smaller than the inside diameter of the flange, and wherein the flange further includes a first annular rib arranged at the first end portion and an annular lip projecting radially inwardly at the first end portion.

2. The cooling tube according to claim 1, wherein the outside diameter of the tube member is about 0.020-inch (0.0508-cm) smaller than the inside diameter of the flange.

3. The cooling tube according to claim 1, wherein the inside diameter of the flange is between about 0.5% and about 1.5% larger than the outside diameter of the tube member.

4. The cooling tube according to claim 1, wherein the outside diameter of the tube member is between about 2.015-inch (5.118-cm) and about 2.025-inch (5.143-cm).

5. The cooling tube according to claim 4, wherein the outside diameter of the tube member is about 2.020-inch (5.131-cm).

6. The cooling tube according to claim 1, wherein the inside diameter of the flange is between about 1.995-inch (5.067-cm) and about 2.005-inch (5.093-cm).

7. The cooling tube according to claim 6, wherein the inside diameter of the flange is about 2.000-inch (5.080-cm).

8. The cooling tube according to claim 1, further comprising: an amount of metallurgical bonding material arranged between the inner surface of the flange and the outer surface of the tube member, the first end of the tube member and the first end portion of the flange being devoid of metallurgical bonding material.

9. The cooling tube according to claim 8, wherein the metallurgical bonding material comprises a brazing material.

10. A ram air fan (RAF) assembly comprising:
 a housing including an outer surface an inner surface that defines an interior portion and an outlet;
 a fan housing including a fan motor and a cooling air inlet portion arranged within the interior portion; and
 a cooling tube extending between the outer surface of the housing and the cooling air inlet portion of the fan housing, the cooling tube comprising:
  a tube member extending from a first end to a second end through an intermediate portion having an outer surface and an inner surface, the outer surface having an outside diameter; and
  a flange mounted at one of the first and second ends of the tube member, the flange including a flange body extending from a first end portion to a second end portion through an intermediate section having an outer surface and an inner surface, the inner surface defining an inside diameter, wherein the outside diameter of the tube member is between about 0.010-inch (0.0254-cm) and about 0.030-inch (0.0762-cm) smaller than the inside diameter of the flange, and wherein the flange further includes a first annular rib arranged at the first end portion and an annular lip projecting radially inwardly at the first end portion.

11. The RAF assembly according to claim 10, wherein the inside diameter of the flange is between about 0.5% and about 1.5% larger than the outside diameter of the tube member.

12. The RAF assembly according to claim 10, wherein the outside diameter of the tube member is between about 2.015-inch (5.118-cm) and about 2.025-inch (5.143-cm).

13. The RAF assembly according to claim 12, wherein the outside diameter of the tube member is about 2.020-inch (5.131-cm).

14. The RAF assembly according to claim 12, further comprising: an amount of metallurgical bonding material arranged between the inner surface of the flange and the outer surface of the tube member, the first end of the tube member and the first end portion of the flange being devoid of metallurgical bonding material.

15. The RAF assembly according to claim 10, wherein the inside diameter of the flange is between about 1.995-inch (5.067-cm) and about 2.005-inch (5.093-cm).

16. The RAF assembly according to claim 15, wherein the inside diameter of the flange is about 2.000-inch (5.080-cm).

17. An aircraft comprising:
 a fuselage extending from a nose portion to a tail portion through a body portion;
 first and second wings projecting from the body portion; and
 a ram air fan (RAF) assembly mounted within the fuselage, the RAF assembly including a housing including an outer surface an inner surface that defines an interior portion, and an outlet, a fan housing including a fan motor arranged within the interior portion and a cooling air inlet portion, and a cooling tube extending between the outer surface of the housing and the cooling air inlet portion of the fan housing, the cooling tube comprising:
  a tube member extending from a first end to a second end through an intermediate portion having an outer surface and an inner surface, the outer surface having an outside diameter; and
  a flange mounted at one of the first and second ends of the tube member, the flange including a flange body extending from a first end portion to a second end portion through an intermediate section having an outer surface and an inner surface, the inner surface defining an inside diameter, wherein the outside diameter of the tube member is between about 0.010-inch (0.0254-cm) and about 0.030-inch (0.0762-cm) smaller than the inside diameter of the flange, and wherein the flange further includes a first annular rib arranged at the first end portion and an annular lip projecting radially inwardly at the first end portion.

18. The aircraft according to claim 17, wherein the outside diameter of the tube member is between about 2.015-inch (5.118-cm) and about 2.025-inch (5.143-cm).

19. The aircraft according to claim 17, wherein the inside diameter of the flange is between about 1.995-inch (5.067-cm) and about 2.005-inch (5.093-cm).

20. The aircraft according to claim 17, further comprising: an amount of metallurgical bonding material arranged between the inner surface of the flange and the outer surface of the tube member, the first end of the tube member and the first end portion of the flange being devoid of metallurgical bonding material.

\* \* \* \* \*